United States Patent [19]

Haussels

[11] 3,920,292

[45] Nov. 18, 1975

[54] COMBINED AXIAL-RADIAL BEARINGS

[75] Inventor: Berthold Haussels, Wermelskirchen, Germany

[73] Assignee: Firma Acousa Saxon S.A., Saxon, Switzerland

[22] Filed: Dec. 5, 1973

[21] Appl. No.: 422,106

[30] Foreign Application Priority Data

| Dec. 8, 1972 | Germany | 2260108 |
|---|---|---|
| Mar. 14, 1973 | Germany | 2312570 |

[52] U.S. Cl. .................................... 308/174
[51] Int. Cl.² ................................ F16D 43/14
[58] Field of Search .............. 308/174, 177, 219

[56] References Cited
UNITED STATES PATENTS

| 2,459,290 | 1/1949 | Rozner | 308/174 |
|---|---|---|---|
| 3,259,442 | 7/1966 | Boghosian | 308/187.1 |
| 3,393,027 | 7/1968 | Barish | 308/174 |
| 3,727,738 | 4/1973 | Briar | 308/187.1 |

*Primary Examiner*—Robert S. Ward, Jr.
*Assistant Examiner*—Richard A. Bertsch
*Attorney, Agent, or Firm*—Karl F. Ross; Herbert Dubno

[57] ABSTRACT

A combined axial-radial bearing comprises first and second bearing rings which have axial and radial bearing means therebetween. Rolling elements form the radial bearing means and can comprise balls, cylindrical rollers or the like to prevent the two bearing rings from being moved axially relative to one another. Bearing cages may be fitted to hold the rolling elements and additionally to form sealing means. The radial and/or axial bearing means may comprise one or more circlets of rolling elements containing balls, needles, or rollers.

19 Claims, 7 Drawing Figures

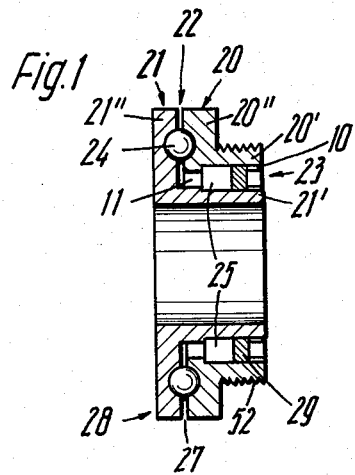
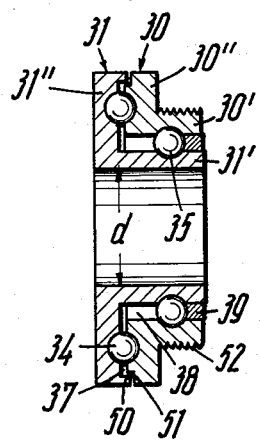
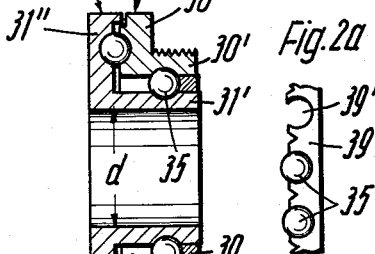
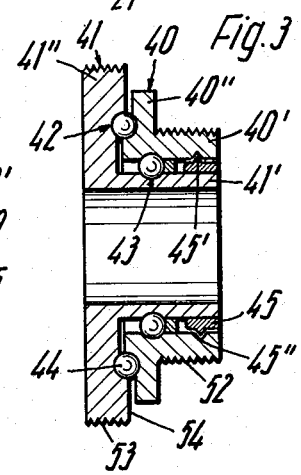
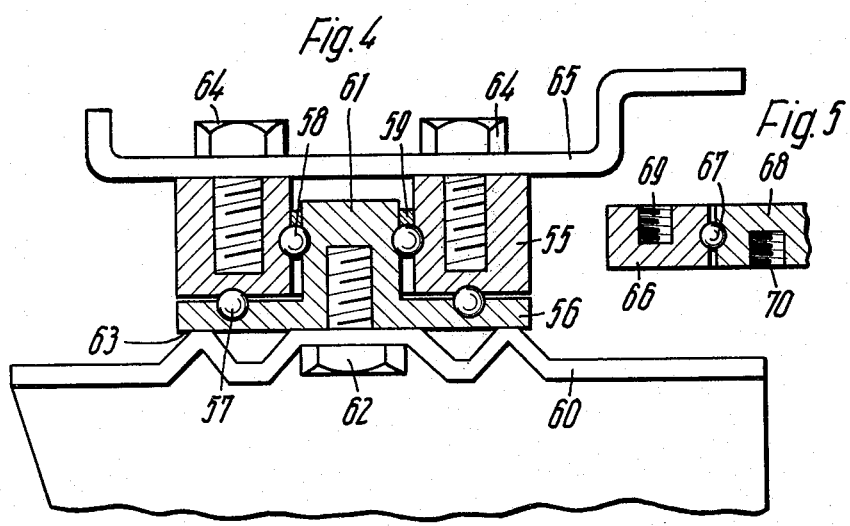

COMBINED AXIAL-RADIAL BEARINGS

FIELD OF THE INVENTION

This invention relates to bearings for components which are rotatably movable relative to one another. The invention is particularly concerned with a combined axial-radial bearing comprising a first bearing ring which is supported radially by radial bearing means and includes a radial flange supported against a second bearing ring. The second ring an axial flange formed as an internal race of the radial bearing means. The bearing rings are supported against one another axially and radially by rolling elements.

DESCRIPTION OF THE PRIOR ART

A rolling bearing of this general form is known in which an outer ring engages around a needle cage by means of which the radial bearing means is formed. This outer ring has a radial flange in whose external surface is provided a groove for balls. The balls, which are contained in a cage, run also in a second bearing ring on which the first bearing ring can support itself after the bearing has been assembled. The bearing rings and the balls contained in the cage do not form a self-supporting structural unit, but are held together on a component, e.g. on a shaft, by a bearing collar and a bearing member opposite the collar. This known bearing, in respect of its radial bearing means, is dependent on the tolerances to which the receiving shaft is manufactured.

A bearing of the kind first mentioned above is also known in which the axial bearing function is performed by balls and the radial bearing function by needles. The two bearing rings are kept together by clamping them tightly between the two components which are to be mounted for rotation relative to one another. It is clear that this rigid clamping considerably affects the bearing means and in particular its useful life.

SUMMARY OF THE INVENTION

It is an object of the invention to provide a combined axial-radial bearing of the kind mentioned initially above which, as a built-in bearing, offers improved possibilities of assembly with associated components. In particular, the bearing should also be suitable for those cases when components are present which are not constantly rotating, so that the bearing construction can be of suitably simpler form if required.

In accordance with one aspect of the invention, there is provided a combined axial-radial bearing for components which are rotatable relative to one another, the bearing comprising a first bearing ring which is supported radially by radial bearing means, a second bearing ring, a radial flange forming part of the first bearing ring in axial bearing relationship to the second bearing ring, an axial flange forming part of the second bearing ring and forming an inner race for the radial bearing means, and rolling elements between the bearing rings forming axial bearing means and the radial bearing means and providing both axial and radial support of one ring by the other. The rolling elements of the radial bearing means are balls, cylindrical rollers or the like providing axial retention of the two bearing rings one on the other.

Preferably, the bearing is one in which the second bearing ring has a radial flange in facing relationship with the radial flange of said first bearing ring, and in which said first bearing ring has an axial flange in facing relationship with the axial flange of the second bearing ring.

The rolling elements are preferably held mutually spaced apart by cage means. The cage means advantageously has windows which are open at one side to receive balls, and is adapted to be pushed over balls constiting the radial bearing means after the two bearing rings have been assembled together.

In order to simplify the assembly of the two bearing rings, a filling channel may be provided for the rolling elements in one or both of the axial flanges. The filling channel may be parallel to the axis of rotation of the bearing utilizing the gap between the two axial flanges, and can be closed by cage means after insertion of the rolling elements.

It is of course also possible additionally to ensure the axial retention of the two bearing rings on one another by means of structural elements of the bearing. The two bearing rings may thus be in engagement with one another by means of a snap connection or the like aiding axial cohesion which, at the same time, may effect sealing of a bearing gap between the rings. The axial bearing means may define an emergency gap between said radial flanges of the bearing rings which disappears when there is no rolling bearing engagement. A gap between the two radial or axial flanges of the bearing rings may be sealed off at least partially by an axially or radially directed collar formed on one of the rings which engages in labyrinth manner in a groove in the other ring. In order to ensure emergency running, a layer or sleeve of low-friction sliding material may be present between a facing pair of the flanges. For this purpose, and in order to reduce manufacturing expenses, it is advantageous if one or both bearing rings are composed of plastic material.

In order to secure the bearing, the axial flange of the first bearing ring and/or the radial flange of the second bearing ring may have external threads. Preferably, the radial flange of the second bearing ring projects radially beyond the radial flange of the first bearing ring, so that there is a lateral abutment surface. It is, of course, also possible to secure the bearing rings in some other way instead of by screwing them onto a rotatable component, for example by pressing them into a receiving tube.

In accordnce with another aspect of the invention there is provided a bearing comprising a first inner bearing ring, a second outer bearing ring having an axial face in facing relationship with an axial face of said first bearing ring, rolling elements between said axial faces forming radial bearing means, threaded socket means in said first bearing ring to receive securing means, and threaded bores in said second bearing ring parallel to the axis of rotation of the bearing to receive other securing means.

This latter bearing can advantageously be secured to components which are rotatable relative to one another by a simple screw connection, which is not possible with known bearings. In this way, rotatable components formed in particular as stamped metal parts can be connected simply by means of this bearing.

The bearings of the invention may be used as built-in bearings of castor wheels for movable objects or for rollers of conveying devices. The known bearings previously used for castor wheels having rolling elements running between pressed-sheet sections. Each bearing takes up either the radial or the axial forces. By using a combined bearing according to the invention, the assembly is simplified and the load capability and the load play space of the castor wheel bearing is increased considerably.

In one bearing of the invention, at least one of the two bearing means comprises a plurality of rolling element circlets. This bearing may take up even greater load forces and is formed in particular as a built-in bearing for supporting movable components on which large tilting forces or torques are exerted.

A further rolling element circlet in one of the two bearing means increases not only the load capability of this type of bearing means, but at the same time unloads the other bearing means when tilting forces act on the bearing. This means that in effect the two bearing rings are formed as one piece with their axial and radial flanges, so that tilt loads acting on a rigid bearing ring are effective on both bearing means. The number of circlets and their arrangement either in the axial bearing means and/or in the radial bearing means depends on the size and direction of the loads arising. With a basically axial load, the axial bearing means preferably has at least two concentric circlets with balls as rolling elements. For very high loads, of course, rollers or the like of higher load-bearing capability can be used instead of balls. In order to minimize the reciprocal effect on the rotary bearing means by inclined forces which do not act in the direction of or perpendicular to the axis of rotation, the rolling elements of the axial bearing means are preferably arranged at the greatest possible distance from the axis of rotation of the bearing. The limits of this distance are set by the size of the components to be supported, the specific loads on the rolling elements, the load capability of the bearing rings without deformation, the tolerances of the components used, etc.

In one preferred embodiment of the invention, the radial bearing means comprises a circlet of balls adjacent to the axial bearing means and a further circlet of needles on the side of said balls remote from the axial bearing means. This construction of the bearing enables it to be assembled simply in respect of the radial bearing means. The ball circlet can be fitted in the manner described above, while the needle circlet is easily inserted into the remaining annular gap between the axial flanges of the rings. It is to be understood that other rolling elements or a sliding bearing can be used instead of the needles.

BRIEF DESCRIPTION OF THE DRAWING

A number of embodiments of bearing in accordance with the invention will now be described by way of example and with reference to the accompanying drawing, in which:

FIGS. 1 to 3 are sectional views through three different embodiments of combined axial-radial bearing;

FIG. 2a is a partial view of a separable ball cage;

FIG. 4 is a part-sectional side view of a combined bearing according to the invention built into a castor wheel fork;

FIG. 5 is a schematic view of a radial ball-bearing for inclusion within a castor wheel fork; and, FIGS. 6 and 7 are cross-sectional views through two further embodiments of combined axial-radial bearing.

DESCRIPTION OF THE PREFERRED EMBODIMENTS

Figure 6:
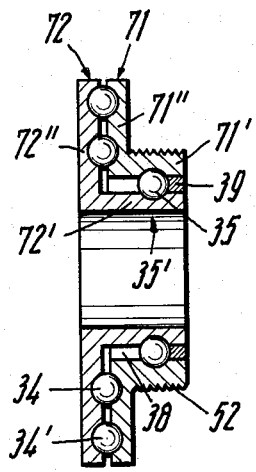

The bearing illustrated in FIG. 1 comprises two bearing rings 20, 21 which are supported against one another by an axial bearing means 22 and by a radial bearing means 23. The first, essentially outer bearing ring 20 comprises an axial flange 20' which has a radially outwardly directed flange 20'' at its end facing the second bearing ring 21. The second bearing ring 21 comprises a radial flange 21'' arranged in face-to-face relationship with the radial flange 20'' and projecting radially inwardly beyond the free internal diameter of the bearing ring 20, and an axial flange 21' or less which constitutes the inner race of the radial bearing means 23.

Between the radial flanges 20'', 21'' are located rolling elements 24 which are formed as balls and are guided in groove tracks in the flanges, these elements ensuring a gap 27 between the radial flanges. The facing surfaces of the axial flanges of the bearing rings are spaced from one another. Between the bearing surfaces of the axial flanges 20', 21' (sleeve and has respectively) are located rolling elements 25 formed as cylindrical rollers. A filling channel 10 is provided to enable the cylindrical rollers 25 to be introduced into the grooves in the axial flanges 20', 21'. This filling channel 10 makes use of the gap 11 between the two axial flanges. It can however alternatively be provided in only one of the axial flanges, even radially, if the corresponding channel is closed again. The filling channel illustrated in FIG. 1 is closed by a cage 29 which keeps the cylindrical rollers 25 spaced from one another after they have been inserted.

The rolling bearing illustrated in FIG. 2 corresponds in its basic construction to the bearing of FIG. 1. The radial flanges 30'', 31'' of the bearing rings 30, 31 are again supported against one another by balls 34. The axial flanges 30', 31' have groove tracks for balls 35 which differ in their bearing surfaces facing one another. While the gap 37 of the axial bearing means is relatively small, the gap 38 of the radial bearing means must be of such a size that a cage 39 can be inserted therein. This cage 39 determines the spacing of the balls 35 from one another, as can be seen from FIG. 2a. The balls 35 received by the windows 39' of the cage are spaced from one another such that they can be inserted into the gap 38 as will be described hereinafter. The balls 34 on the other hand can be inserted into the axial bearing means in the maximum possible number.

The assembly of the bearing illustrated in FIG. 2 takes place as follows. Firstly, the axial bearing means is assembled in the normal manner, with the bearing ring 30 being pushed over the axial flange 31' after insertion of the balls 34. Then, the bearing ring 30 is pushed eccentrically in the radial direction to such an extent that the balls 35 can be inserted. If, for example, half or somewhat less than half of the length of the groove tracks of the axial flanges 30', 31' are filled with balls 35, then these are distributed regularly around the periphery after the bearing ring 30 has been returned to its central position. The balls or other rolling elements are kept distributed in this way by the cage 39 after it has been fitted into the gap 38. For assembly, it may be necessary to make the gaps 37 and/or 38 somewhat larger than is strictly necessary or to make the grooves for the balls 34, 35 somewhat oblate. The same applies if the bearing illustrated in FIG. 1 is put together in the way described above but if there is no filling channel.

The bearing illustrated in FIG. 3 comprises two bearing rings 40, 41 which correspond in their basic formation to the bearing rings of the previously described bearings. This bearing has a special axial bearing means 42, in which balls 44 are again used as rolling elements corresponding to the bearings of FIG. 1 and 2, but in which they constitute inclined ball bearings. The portion of the radial flange 41'' of ring 41 which is radially outward of the track of the axial bearing means projects in the axial direction towards the radial flange 40'' beyond the central plane of the balls 44. The radial flange 40'' is here somewhat rebated, while radially inwardly of the track of the balls 44 it for its part projects axially towards the radial flange 41'', which here is correspondingly rebated. This axial bearing construction 42 can thus transfer radial forces to an increased extent and it can take up inclined forces or torques which are exerted on the bearing rings 40, 41.

The radial bearing means 43 is formed with an additional sliding bearing. Thus, the axial flange 41' carries a special sleeve 45 of low-friction sliding material on its outer surface facing the axial flange 40'. The sleeve 45 of sliding material serves to affect the frictional behaviour of the slide bearing, in particular during emergency running, while its material forms a particularly favorable friction combination with the material of the axial flange 40' and of the bearing ring 40. Known low-friction sliding materials which can be produced and applied economically are used for this. The sleeve 45 can thus be formed as a plastic sleeve pressed onto the axial flange 41'. A circumferential collar 45' on the sleeve 45 engages in a corresponding annular groove 45'' in the axial flange 40' and thus ensures its position relative to the bearing ring 41. The sleeve 45 is simply pressed in after assembly of the bearing, so that the collar 45' and the annular groove 45'' fit together as a snap connection.

It is to be understood that the bearing rings of all the embodiments described above can be held together in this or a similar manner. Alternatively, they may be held together by caps or clamps.

In certain cases, it is preferable to keep the bearing gaps as small as possible. Because of the play present in the two bearing means of a bearing as described above, it can happen that the forces acting at an angle on one bearing ring are very great and can lead to local excess loading. In order to prevent this, the gap can be kept very small so that a sliding bearing is maintained even if there is no rolling bearing. This means that in FIG. 1 the small gap formed as an emergency gap 27 between the radial flanges 20'', 21'' disappears for example in the region 28 of the bearing, so that the two radial flanges are supported directly against one another. This can happen if the running surfaces of the rolling elements 24 are worn.

In certain cases, the bearing caps are preferably covered or sealed to prevent dirt from entering. Thus, the bearing of FIG. 2 has on the periphery of its radial flange 31'' an annular collar 50 which is directed axially towards the radial flange 30'' and which engages like a labyrinth in an annular groove 51 in the radial flange 30''. The bearing gap 38 is sealed by the cage 39.

The choice of the materials for the two bearing rings depends on the loads arising and on the desired sliding properties. Corrosion behavior and emergency running properties may also have to be taken into account. If a plastic material is chosen as the material for one or both bearing rings, then machining and processing are easier, which would result in more economical production. The weight of the bearing is thus reduced. Acetal resin could be used for example as the plastic material.

For installation or attachment of the bearing to the associated components which are rotatable relative to one another, the bearing rings are provided with threads. All the outer bearing rings illustrated in the Figures have an external thread 52 on their axial flange, on to which a nut or a ring can for example be screwed so as to secure a bearing plate. The inner bearing ring 41 has an external thread 53 for screw connection. It projects radially beyond the radial flange 40'' of the outer bearing ring and so forms an abutment surface 54. It should be understood that the external threads 52, 53 of the bearing rings, and in particular their external form, can be provided in accordance with the connection requirements at the place of assembly.

FIG. 4 shows an example of a bearing built into a castor wheel for movable objects, such as hospital beds. A combined axial-radial bearing is illustrated which corresponds in principle to the bearing of FIG. 2. It consists of two bearing rings 55, 56 which are supported against one another axially by balls 57 and radially by balls 58 spaced from one another by a cage 59. While the bearings of FIGS. 1 to 3 have a free or open internal diameter $d$ by means of which they can for example be placed on a shaft or on a stub axle, the bearing ring 56 in FIG. 4 includes a massive inner core 61 provided with a threaded bore into which a screw 62 is fitted. By means of this, a steering fork 60 is pressed firmly against the outer surface 63 of the bearing ring 56. The steering fork has at its lower end (not shown) a wheel or roller whose axis is arranged eccentrically, i.e. not directly below the bearing axis.

The bearing ring 55 is of massive form or is so formed that it can receive screws 64 in threaded bores therein. By means of these screws 64 a bearing plate 65, which may be attached for example to the framework of a hospital bed, is secured.

When moving the hospital bed, the castoring wheel or roller secured to the steering fork 60 trails behind it and thus enables the movement to be guided. The forces thus arising on the bearing act not ony in the axial or radial direction, but try to tilt the bearing rings. The bearing is equal to these forces, and the carrier plate 65 and the steering fork 60 are thus held together. The assembly and dismantling of the castor wheel are particularly simple.

FIG. 5 shows a special formation for a radial ball bearing which is designed for radial loads and to a certain extent also for axial loads. Between the inner ring 68 and the outer ring 66 are arranged balls 67 with or without a cage, as is normal for ball bearings. This ball bearing can be secured to associated components as in FIG. 4. The outer ring 66 has threaded bores 69, while the inner ring has a threaded bore 70 arranged on the longitudinal axis of the bearing. As regards choice of material and bearing gaps, the same applies as with the bearings illustrated in FIGS. 1 to 3. It is to be understood that the bearing of FIG. 5 can also be provided with an external thread as in FIG. 3 or with an internal thread passing therethrough.

The combined axial-radial bearing illustrated in FIG. 6 comprises a first bearing ring 71 having an axial flange 71' of the radial bearing means and a radial flange 71'' of the axial bearing means. A similarly formed second bearing ring 72 has an axial flange 72' and a radial flange 72''. The two bearing rings are arranged in relation to one another so that a rolling element circlet 35' comprising balls 35 can be fitted in between the axial flanges to constitute the radial bearing. The inner axial flange 72' is mounted for example on a shaft, while the outer axial flange 71' serves to secure a for example stationary component. A thread 52 on the flange 71' may have a connecting ring which is not illustrated screwed thereon.

The balls 35 are received in windows 39' of a cage 39 as in FIG. 2a and are thus held spaced apart.

Figure 7:
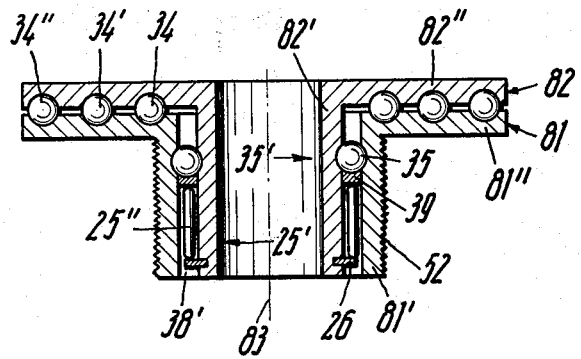

The bearing illustrated in FIG. 7 consists of two bearing rings 81, 82, with two rows of rolling elements arranged between their axial flanges 81', 82', and with three rolling element circlets arranged between their radial flanges 81'', 82''. The rolling element circlets with their balls 34, 34', 34'' providing axial support are arranged concentrically about the axis of rotation 83 and the outer rows are filled with more balls corresponding to their greater radii. With inclined loads, which then act neither parallel to the axis of rotation 83 nor perpendicular thereto, these rolling element circlets can to a great extent fend off the forces affecting the radial bearing means, even with particularly high loads. This is of importance for castor wheels for example. The wheel fork is in this case secured for example to the bearing ring 81 and itself carries the wheel axle, however not centrally with respect to the bearing but, depending upon its formation, at a distance from the axis of rotation which exceeds the radius of the radially outermost rolling element circlet of the axial bearing means. High axial loads and impacts when the wheel strikes obstacles on the ground bring about large forces. Radial force components can easily be taken up by the radial bearing means if it is suitably designed. The same applies also to axial force components, but it must be taken into consideration that insufficient dimensioning of one bearing means directly affects the other bearing means. Thus, with high axial loads, large axial forces can be exerted on the radial bearing means if the axial bearing means is not suitably matched to the former. A plurality of rolling element circlets in one or both of the rotary bearing means is an advantageous way of taking up extreme inclined and impact loads received by a bearing of the combined axial-radial construction shown.

The radial bearing means shown in FIG. 7 comprises a rolling element circlet 35' with balls 35 and a further needle circlet 25' with needles 25'' on the side of the balls 35 remote from the axial bearing means. The rolling element circlet 35' is assembled as described above in relation to FIG. 2. Then, the needles 25'' are inserted into the gap 38' and are prevented from falling out by a snap ring or circlip 36. The bearing is held together in its assembled state by the balls 35. It is to be understood that other rolling elements can be used instead of the needles 25'', for example balls. In such a case, the two bearing rings 81, 82 must be assembled so that for example all rolling element circlets are arranged in readiness on one of the bearing rings, and then the other bearing ring is brought to its final position with its axial flange having been either cooled or heated to enable it to fit into or over the other axial flange.

I claim:

1. A combined axial-radial for components which are rotatable relative to one another, said bearing comprising a first bearing ring having a radial flange and an axial flange and connectable to one of said components, a second bearing ring having a radial flange confronting said radial flange of said first bearing ring and an axial flange surrounding the axial flange of said first bearing ring, said second bearing ring being connectable with another of said components, radial bearing means comprising a plurality of rolling elements received in a circular array between said radial flanges, said radial flanges being provided with confronting grooves forming races for said rolling elements, and axial bearing means between said axial flanges and including an array of rolling elements, said axial flanges being formed with mutually confronting recesses forming races for the rolling elements of said axial bearing means, said radial bearing means providing axial retention of the two bearing rings one on the other.

2. A bearing according to claim 1, further comprising cage means holding the rolling elements mutually spaced apart.

3. A bearing according to claim 2, in which the cage means has windows which are open at one side to receive balls, and is adapted to be pushed over balls constituting the rolling elements of said radial bearing means after the two bearing rings have been assembled together.

4. A bearing according to claim 1, in which a filling channel is provided for the rolling elements in at least one of the axial flanges.

5. A bearing according to claim 4, in which the filling channel is arranged parallel to the axis of rotation of the bearing using the gap between the two axial flanges and is closed by cage means after insertion of the rolling elements.

6. A bearing according to claim 1, further comprising mating means on each of the two bearing rings in engagement with one another by a snap connection aiding axial retention of the rings.

7. A bearing according to claim 1, in which the axial bearing means defines an emergency gap between said radial flanges of the bearing rings which disappears when there is no rolling bearing engagement.

8. A bearing according to claim 1, which includes an axially or radially directed collar formed on one of said bearing rings and engaging in labyrinth manner in a groove formed in the other bearing ring, thereby at least partially to seal a gap between the bearing rings.

9. A bearing according to claim 1, which includes a layer or sleeve of low-friction sliding material between a facing pair of said flanges.

10. A bearing according to claim 1, in which at least one of the bearing rings is of plastic material.

11. A bearing according to claim 1, in which the axial bearing means is formed as a shoulder bearing.

12. A bearing according to claim 1, in which at least one of the two bearing means comprises a plurality of rolling element circlets.

13. A bearing according to claim 12, in which the axial bearing means comprises at least two concentric circlets with balls as the rolling elements.

14. A bearing according to claim 12, in which the rolling elements of the axial bearing means are arranged at the maximum distance from the axis of rotation of the bearing.

15. A bearing according to claim 12, in which the radial bearing means comprises a circlet of balls adjacent to the axial bearing means and a further circlet of needles on the side of said balls remote from the axial bearing means.

16. A bearing according to claim 1, in which at least one of the axial flange of said first bearing ring and the radial flange of said second bearing ring is externally threaded.

17. A bearing according to claim 16, in which the radial flange of the second bearing ring projects radially beyond the radial flange of the first bearing ring.

18. A bearing comprising a first inner bearing ring, a second outer bearing ring having an axial face in facing relationship with an axial face of said first bearing ring, rolling elements between said axial faces forming radial bearing means, threaded socket means in said first bearing ring to receive securing means, and threaded bores in said second bearing ring parallel to the axis of rotation of the bearing to receive other securing means.

19. A bearing according to claim 18, which constitutes a built-in bearing of a castor wheel.

* * * * *